(12) United States Patent  
Kulkarni et al.

(10) Patent No.: US 12,554,040 B2  
(45) Date of Patent: Feb. 17, 2026

(54) WELL CORRELATION USING GLOBAL AND LOCAL MACHINE LEARNING MODELS

(71) Applicant: SCHLUMBERGER TECHNOLOGY CORPORATION, Sugar Land, TX (US)

(72) Inventors: Mandar Shrikant Kulkarni, Yerawada (IN); Purnaprajna Raghavendra Mangsuli, Pune (IN); Hiren Maniar, Houston, TX (US); Aria Abubakar, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 417 days.

(21) Appl. No.: 18/006,602

(22) PCT Filed: Jul. 26, 2021

(86) PCT No.: PCT/US2021/070949  
§ 371 (c)(1),  
(2) Date: Jan. 24, 2023

(87) PCT Pub. No.: WO2022/026988  
PCT Pub. Date: Feb. 3, 2022

(65) Prior Publication Data  
US 2023/0273338 A1 Aug. 31, 2023

Related U.S. Application Data

(60) Provisional application No. 63/056,852, filed on Jul. 27, 2020.

(51) Int. Cl.  
*G01V 20/00* (2024.01)  
*G06N 20/00* (2019.01)

(52) U.S. Cl.  
CPC ............. *G01V 20/00* (2024.01); *G06N 20/00* (2019.01)

(58) Field of Classification Search  
CPC . G01V 20/00; G01V 1/50; G01V 3/18; G06N 20/00; G06N 20/20; G06N 3/045;  
(Continued)

(56) References Cited

U.S. PATENT DOCUMENTS 11,360,233 B2 * 6/2022 Ramfjord ................ E21B 7/04  
2003/0132955 A1 * 7/2003 Le Floch ................ G11B 27/28  
375/E7.089

(Continued)

FOREIGN PATENT DOCUMENTS

CN 105899749 B * 6/2018 .............. E21B 7/04  
WO 2015042103 A1 3/2015  
(Continued)

OTHER PUBLICATIONS

Audhkhasi, Kartik, and Shrikanth Narayanan. "A globally-variant locally-constant model for fusion of labels from multiple diverse experts without using reference labels." IEEE transactions on pattern analysis and machine intelligence 35, No. 4 (2012): 769-783 (Year: 2012).*

(Continued)

*Primary Examiner* — Douglas Kay  
(74) *Attorney, Agent, or Firm* — Jeffrey D. Frantz

(57) ABSTRACT

A method for correlating well logs includes receiving a well log as input to a first machine learning model that is configured to predict first markers in the well log based at least in part on a global factor of the well log, receiving the well log as input to a second machine learning model that is configured to predict second markers in the well log based at least in part on local factors of the well log, generating a set of predicted well markers by merging at least some of the (Continued)

first markers and at least some of the second markers, and aligning the well log with respect to one or more other well logs based at least in part on the set of predicted well markers.

13 Claims, 7 Drawing Sheets

(58) Field of Classification Search
CPC ....... G06N 3/08; E21B 2200/22; E21B 47/09; G06F 17/153
See application file for complete search history.

(56) References Cited

U.S. PATENT DOCUMENTS

| | | | | |
|---|---|---|---|---|
| 2015/0088424 | A1* | 3/2015 | Burlakov | G01V 1/40 702/6 |
| 2015/0347898 | A1 | 12/2015 | Hiu et al. | |
| 2017/0132512 | A1* | 5/2017 | Ioffe | G06V 10/774 |
| 2018/0247226 | A1* | 8/2018 | Forman | G06F 18/214 |
| 2021/0034971 | A1* | 2/2021 | Han | G06N 3/063 |
| 2021/0125057 | A1* | 4/2021 | Choi | G06N 3/04 |
| 2021/0381362 | A1* | 12/2021 | Cha | E21B 47/04 |
| 2022/0392637 | A1* | 12/2022 | Kollada | G16H 50/30 |
| 2023/0084403 | A1* | 3/2023 | Kaul | G06N 3/088 703/10 |

FOREIGN PATENT DOCUMENTS

| | | |
|---|---|---|
| WO | 2019055565 A1 | 3/2019 |
| WO | 2020146863 A1 | 7/2020 |

OTHER PUBLICATIONS

B. Han, and et al., "Construction of a geospatial predictor by fusion of global and local models," 2005 7th International Conference on Information Fusion, Philadelphia, PA, USA, 2005, pp. 8 (Year: 2005).*

Brazell S. et al., 'A Machine-Learning-Based Approach to Assistive Well-Log Correlation', Petrophysics, vol. 60, No. 4, Aug. 2019, pp. 469-479.

Baldwin, J. et al., 'Computer Emulation of Human Mental Processes: Application of Neural Network Simulators to Problems in Well Log Interpretation', SPE Annual Technical Conference and Exhibition, Oct. 1989, pp. 481-493.

Luthi, S.M. et al., 'Well-log correlation using a back-propagation neural network', Mathematical Geology, vol. 29, No. 3, 1997, pp. 413-425.

Kulkarni, M. et al., 'Soft Attention Convolutional Neural Networks for Rare Event Detection in Sequences', NeuralIPS 2020 workshop on AI for Earth Sciences, Nov. 2020, [retrieved from internet on Oct. 15, 2021] <URL: https://ai4earthscience.github.io/neurips-2020-workshop/papers/ai4earth_neurips_2020_08.pdf>, 7 pages.

Search Report and Written Opinion of International Patent Application No. PCT/US2021/070949 dated Oct. 25, 2021; 9 pages.

International Preliminary Report on Patentability of International Patent Application No. PCT/US2021/070949 dated Feb. 9, 2023; 6 pages.

* cited by examiner

WELL CORRELATION USING GLOBAL AND LOCAL MACHINE LEARNING MODELS

CROSS-REFERENCE TO RELATED APPLICATIONS

This application is a National Stage Application of and claims benefit to PCT Patent Application No. PCT/US2021/070949, filed on Jul. 26, 2021, which claims benefit from and priority to U.S. Provisional Patent Application having Ser. No. 63/056,852, which was filed on Jul. 27, 2020, and is incorporated herein by reference in its entirety.

BACKGROUND

For wellbore interpretation workflows, formation boundaries ("tops" or "markers") in the wells in a basin are marked. A well can have single or multiple logs, and the tops may be picked based at least in part on the one or more logs. Examples of such logs include gamma ray (GR), resistivity (RES), density (DEN), sonic, etc. Well-top correlation is generally performed manually, using a process by which a geologist visually examines multiple logs from wells in close geographic proximity, and identifies and marks ("labels") the tops for those wells. Since this traditional approach relies on visual cues in logs, the overall process is time consuming and error prone. Furthermore, the task is made more cumbersome for tops that have subtle visual signatures in the logs.

SUMMARY

Embodiments of the disclosure include a method for correlating well logs that includes receiving a well log as input to a first machine learning model that is configured to predict first markers in the well log based at least in part on a global factor of the well log, receiving the well log as input to a second machine learning model that is configured to predict second markers in the well log based at least in part on a local factor of the well log, generating a set of predicted well markers by merging at least some of the first markers and at least some of the second markers, and aligning the well log with respect to one or more other well logs based at least in part on the set of predicted well markers.

Embodiments of the disclosure also include a non-transitory computer-readable medium storing instructions that, when executed by one or more processors of a computing system, cause the computing system to perform operations. The operations include receiving a well log as input to a first machine learning model that is configured to predict first markers in the well log based at least in part on a global factor of the well log, receiving the well log as input to a second machine learning model that is configured to predict second markers in the well log based at least in part on a local factor of the well log, generating a set of predicted well markers by merging at least some of the first markers and at least some of the second markers, and aligning the well log with respect to one or more other well logs based at least in part on the set of predicted well markers.

Embodiments of the disclosure further include a computing system that includes a display device, one or more processors, and a memory system including one or more non-transitory computer-readable media storing instructions that, when executed by at least one of the one or more processors, cause the computing system to perform operations. The operations include receiving a well log as input to a first machine learning model that is configured to predict first markers in the well log based at least in part on a global factor of the well log, the global factor representing a characteristic of the well log as a whole, receiving the well log as input to a second machine learning model that is configured to predict second markers in the well log based at least in part on a local factor of the well log, the local factor representing a characteristic of an individual layer of a plurality of layers represented in the well log, generating a set of predicted well markers by merging at least some of the first markers and at least some of the second markers, aligning the well log with respect to one or more other well logs based at least in part on the set of predicted well markers, generating a digital model of a subterranean volume through which the well log extends based at least in part on the well log that was correlated to the other well logs, and displaying the digital model using the display device.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms.

These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
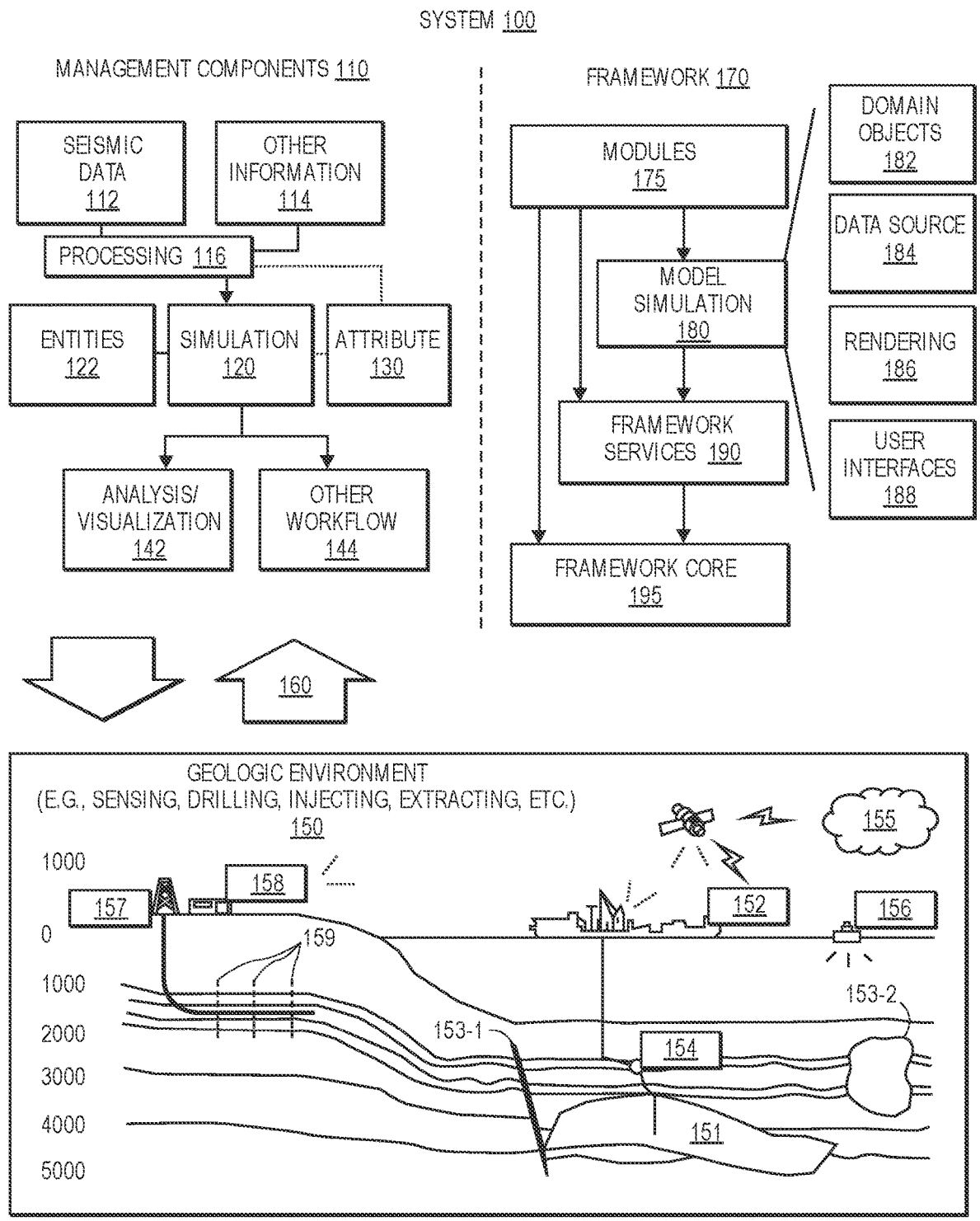
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based at least in part on data acquired via sensing, observation, etc. (e.g., the seismic data component 112 and other information component 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based at least in part on predefined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based at least in part on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based at least in part on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc.

Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based at least in part on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
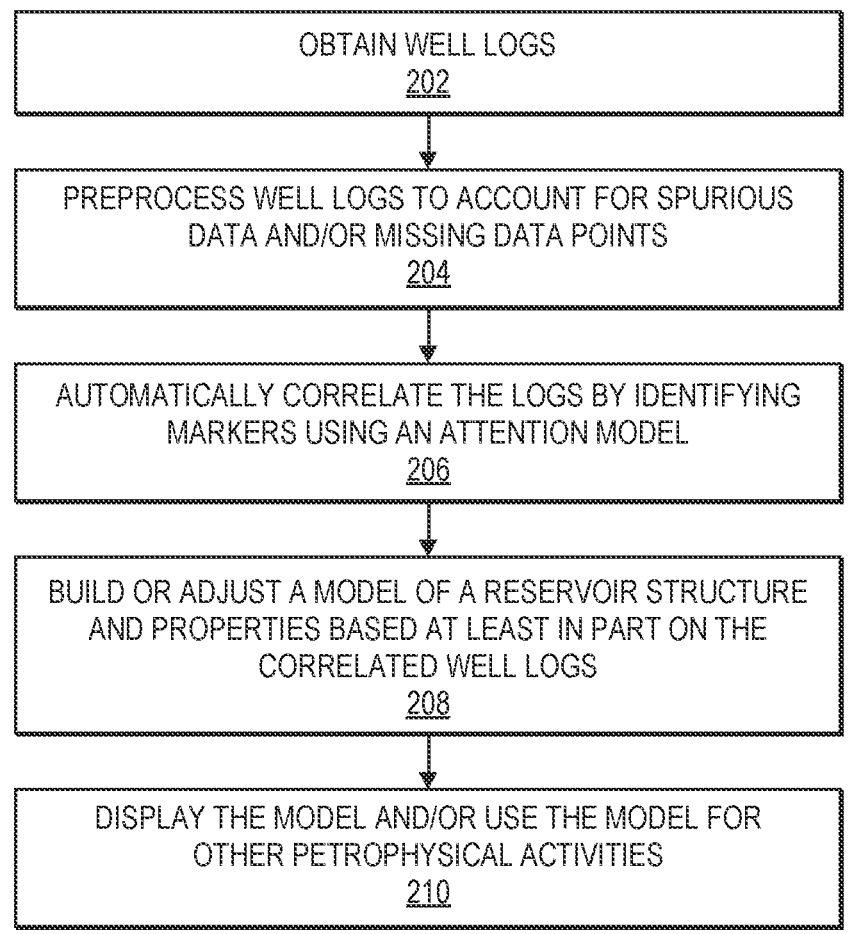
FIG. 2 illustrates a flowchart of a method for correlating well logs and generating a model therefrom, according to an embodiment.

FIG. 2 illustrates a flowchart of a method 200 for generating reservoir structure and/or property models based at least in part on well logs, according to an embodiment. It will be appreciated that various activities of this method 200 may be performed in any order, simultaneously, in parallel, separated into two or more activities, or grouped together into fewer activities.

The method 200 may include obtaining well logs, as at 202. The well logs may be recordings of measurements made by instruments deployed into a well. The measurements may be taken along the entirety or a portion of the well. Examples of such measurements include gamma ray, resistivity, and density. The well logs can then be used to infer various properties/structures of the subterranean formation proximal to the well.

The logs may be preprocessed to account for interference (e.g., caused by environmental disruption) or other errant or spurious signals and/or missing data points, as at 204. For example, the logs may be initially checked for presence of washout zones, outliers, missing data and other issues that could result during acquisition activities.

Figure 3:
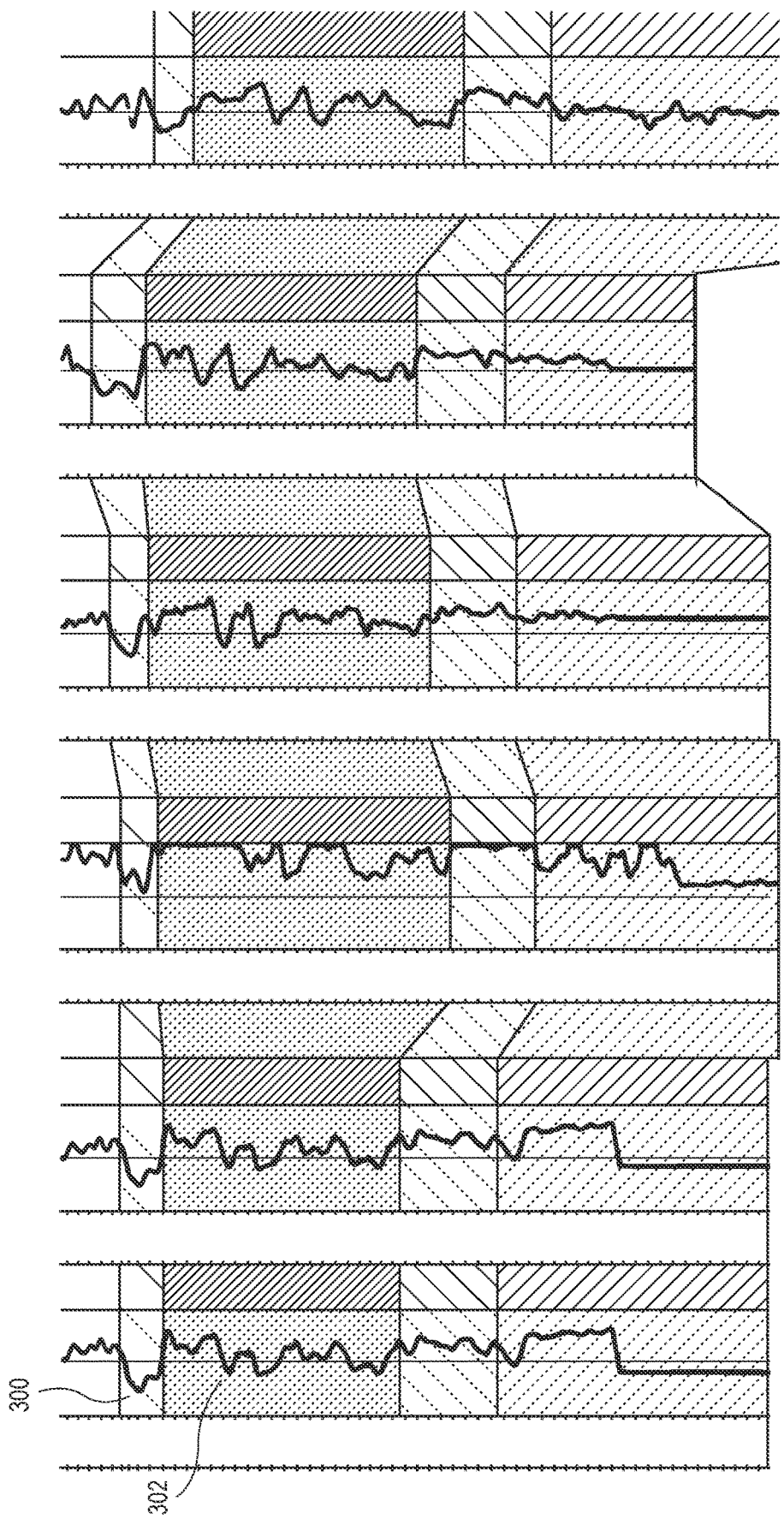
FIG. 3 illustrates view of a plurality of correlated well logs, according to an embodiment.

After preprocessing the data, the logs may be correlated, as at 206. The correlation may be automatic, using a trained attention model, as will be described in greater detail below, to identify corresponding geological formations in the field or basin, as between logs, and then to align the wells according to the placement of "markers" or "tops" of these formations. FIG. 3 illustrates an example of several well logs aligned based at least in part on such markers. The markers may demarcate the shallowest depth ("top") of successive formation layers (e.g., geologically homogenous vertical intervals of a subterranean domain).

FIG. 3, for example, includes indications of formation layers 300 and 302. As can be seen, the depths at which the tops of the layers 300, 302 are located may vary from well-to-well. Thus, since it may be desirable to determine properties of the formation layers based at least in part on the well logs, correlating strictly on depth may produce a poor result, since a given depth may represent different formation layers in different wells. Further, some formation layers may be "pinched off" or otherwise not present at each well. Thus, some wells in a given dataset may have different log measurements and some markers may not be present in some wells (while they are present in other nearby wells) because of the geological complexity of that field. The well logs are thus correlated based at least in part on the location of the well markers, e.g., rather than strictly based at least in part on depth, to account for such geological complexity. One or more quality control, testing, and/or validation worksteps may follow the correlation, e.g., to quantify uncertainty and/or determine if the automatic correlation is reliable.

Based at least in part on the correlated well logs, a model of a reservoir structure and/or formation properties may be constructed, as at 208, which may then be displayed and/or used for other modeling and interpretation workflow activities, as at 210. Such models have a variety of practical applications, and advancements provided by the present disclosure in more accurately and efficiently producing such models will be apparent to one of skill in the art. For example, drilling trajectories can be planned based at least in part on the models, reservoir locations and/or contents can be predicted, fluid flow models can be produced, facies models can be generated, etc. Such models can thus provide insights to operators as to where to drill, how (e.g., what equipment, parameters, etc.) to drill, and what to expect during drilling. Further, enhanced oil recovery process can be developed and implemented based at least in part on these models, production plans can be established, etc. Systematic, accurate, and efficient correlation of well logs may contribute to enhanced quality of and enhanced efficiency in generating such models, which may carry through to any of these applications.

Figure 4:
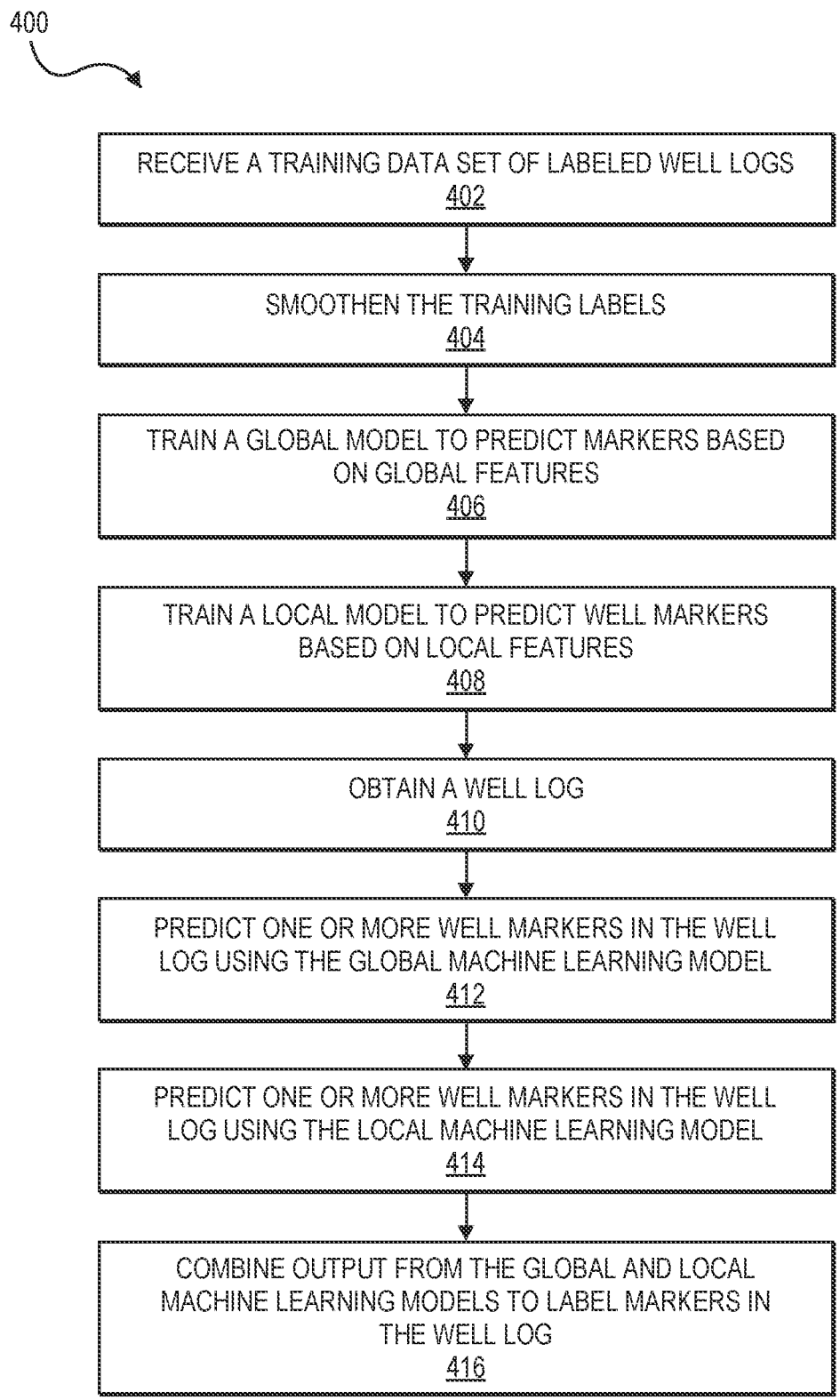
FIG. 4 illustrates a flowchart of a method for correlating well logs, according to an embodiment.

FIG. 4 illustrates a flowchart of a method 400 for automatically correlating well logs in a field or basin, according to an embodiment. The method 400 may be performed as part of the method 200 discussed above, and thus should not be considered mutually exclusive thereto. Further, various aspects of the method 400 may be performed in the order presented herein, or in any other order, combined, separated, or conducted in parallel. It will be appreciated that various activities of this method 400 may be performed in any order, simultaneously, in parallel, separated into two or more activities, or grouped together into fewer activities.

The method 400 may use an attention model, e.g., a soft attention-based Convolutional Neural Network (CNN). Such CNNs may be able to automatically scale down the effect of those portions of logs that contribute less significantly towards predicting a marker, which may be desired since the log measurements can be sensitive to environment and acquisition-based noise that do not represent formation property changes.

Figure 5:
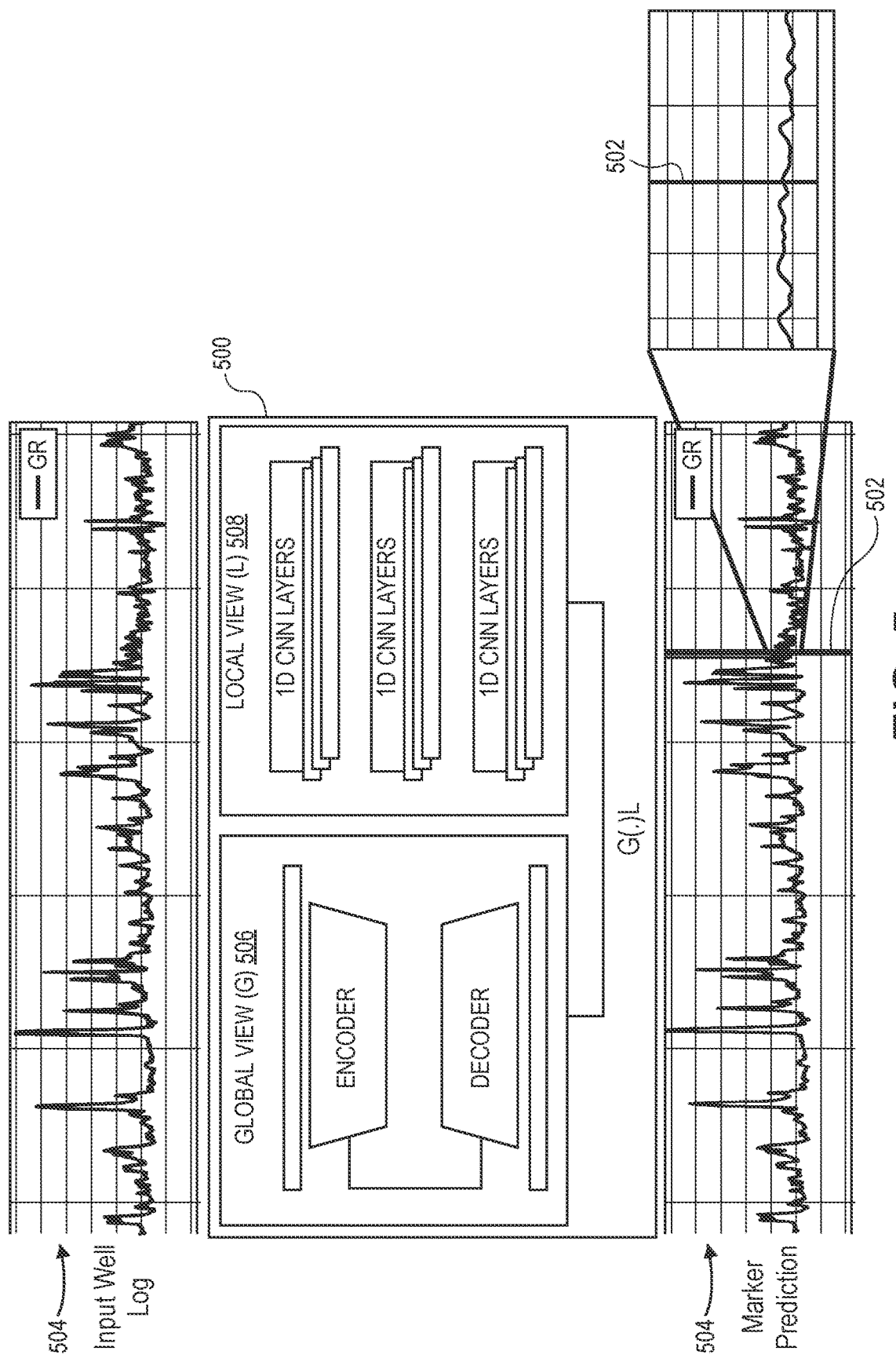
FIG. 5 illustrates a schematic view of a machine-learning system that is configured to identify well tops for well log correlation, according to an embodiment.

FIG. 5 illustrates an example of such a soft attention-based CNN 500, according to an embodiment. As shown, the CNN 500 is trained to predict markers 502 in a well log 504. The CNN 500 generally includes a global "view" 506 and a local "view" 508, which may be two different machine learning models (and thus may also be referred to herein as "global model" 506 and "local model" 508).

In an embodiment, the global view model 506 may be or be similar to a U-Net-based encode-decoder machine learning architecture with skip connections between the mirroring layers of the encoder and the decoder. The skip connections provide a solution for vanishing gradients.

Furthermore, the encoding layers include one-dimensional (1D) convolution layers followed by a pooling layer, and the decoding layers include 1D convolution layers following upsampling (interpolation) layers. The individual convolution layers may be followed by a normalization and dropout layer, which acts as a form of regularization at the time of training, to assist in minimizing a loss function. The presence of successive pooling layers in the global model 506 allows the model 506 to progressively increase the receptive field towards the deeper layers of the model and, thus, capture the long-range patterns in the log, i.e., "global" factors (e.g., shapes, trends, measurement values, etc.), which may apply across the entirety of the log (and permit comparisons between logs based at least in part on such factors).

By contrast, the local model 508 includes stacked, one-dimensional convolution layers, which are configured to perform a local operation, allowing the model 508 to focus on variations in the logs at a local level, e.g., those areas that bound formations. These may be referred to as "local" factors, referring to changes in log characteristics (shape, measurement values/trends, etc.) within a given interval (e.g., within an individual formation) that permit the identification and correlation of tops across wells.

The convolutional layers described above, for the local and global view models 506, 508, may be inception layers. In this embodiment, the input tensor is convoluted with filters of varying dimensions and each of these resulting feature maps is concatenated and fed to the next layer in the architecture.

Referring again to FIG. 4, the method 400 may receiving a training data set of labeled well logs, as at 402. The training data set may be generated, for example, by one or more human operators reviewing and evaluating one or more well logs and supplying labels of the markers therein. Further, in at least some embodiments, different types of well logs can be used, e.g., having different measurements. Thus, the method 400 can be implemented to predict markers based at least in part on combinations of measurements (e.g., gamma ray logs and density logs), e.g., simultaneously, which may be difficult for a human user to accomplish, as different types of signals are being considered.

A supervised training regime may be employed in 401, 402 to train the two-part model 500. To supervise this learning, an interpreter provides the depth values at which a marker is present in a given well, and the name (or some other identifier) of the formation that the associated top represents. This information is converted to a one-hot vector for each marker, which may permit the model to be trained independently for individual markers. The architecture may be fully convolutional to allow for training with logs with varying lengths.

The resultant tensor at the output is the dot-product of tensor out of the local model and that of the global model. This is an element-wise operation and can be shown as below:

$$A(x_i)=G(x_i)L(x_i) \quad (1)$$

where A denotes the output of the soft-attention block, G denotes the output of the global block and L, that of the local. $x_i$ is the input log from the ith well. In some embodiments, a 'tan h' activation (e.g., instead of the sigmoid) may yield beneficial results. In addition, the use of dilated filters for the inception layers has benefits for producing feature maps. Eventually, the scaled tensor $A(x_i)$ may be mapped to the output layer through a sigmoid activation.

The model 500 may be trained to minimize binary cross-entropy loss with a condition to stop if there is no significant change in the validation loss. As can be seen in FIG. 3, for each value of depth in a given log, there are relatively few markers in comparison to the overall depth resolution in the ground-truth mask. This poses a label-imbalance in the segmentation, as the absence of a marker may be considered class 0 and presence, class 1. Thus, a majority of the points in the log are class 0 and very few class 1. To remedy this to some extent, the training may be smoothened by convolving a Gaussian kernel on the imbalanced ground truth.

Figure 6A:
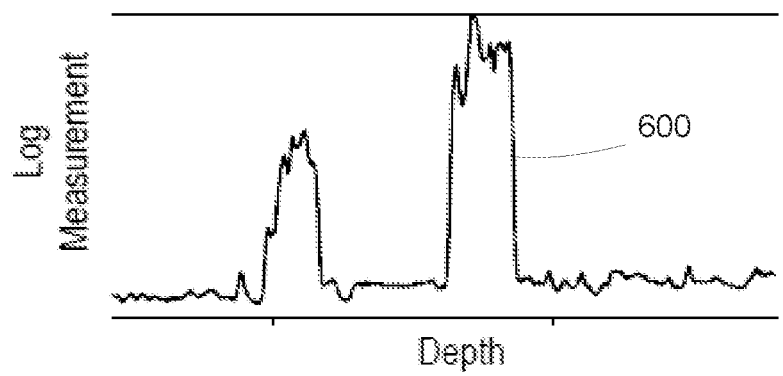
FIG. 6A illustrates a portion of a well log, according to an embodiment.
Figure 6B:
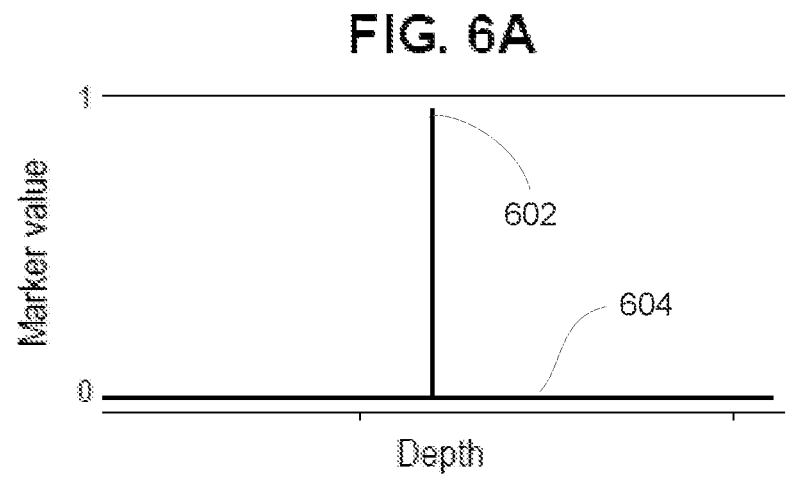
FIG. 6B illustrates a signal of a marker for a well top in the well log, according to an embodiment.
Figure 6C:
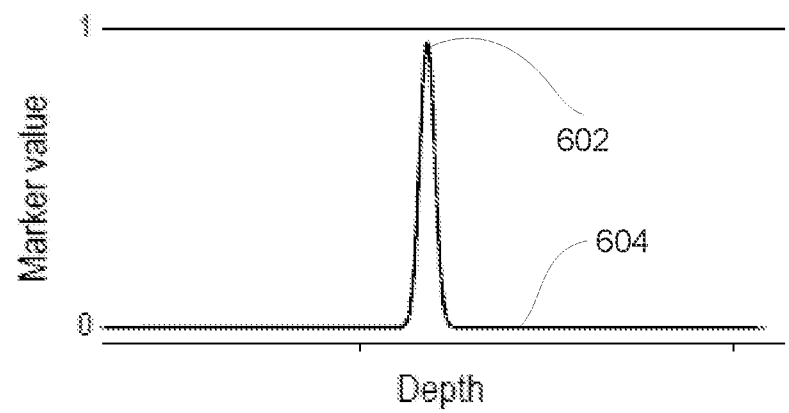
FIG. 6C illustrates the signal after a smoothening operation is applied, according to an embodiment.

Such smoothening of the labels is illustrated in FIGS. 6A, 6B, and 6C. More particularly, in FIG. 6A, there is shown a section of a well log signal 600 in which a top is present. The top may be identified, as discussed above and/or below, and in FIG. 6B, the top is labeled as 602. More particularly, FIG. 6B illustrates a marker signal 604, which is zero at all points that are not the top 602, and 1 (or some other scalar) at the top 602. In FIG. 6C, the marker signal 604 is smoothened, such that a Gaussian distribution centered at the top 602 is established.

Referring again to FIG. 4, the global and local models may be trained, as at 406 and 408, e.g., using the training data set received at 402. This may proceed by iteratively feeding the training pairs (e.g., well logs and ground-truth labels e.g., generated by a human user) to the models 506, 508 until the combination thereof minimizes a loss function. Further, the models 506, 508 may be trained and operate independently, e.g., in parallel, such that completion of operations for one model 506 may not be required for training or other operations using the other model 508.

Once the models 506, 508 are trained, the method 400 may proceed to implementing the models 506, 508, e.g., in parallel. For example, the method 400 may include obtaining a well log, as at 410. The well log may not include pre-labeled markers in at least some embodiments. The method 400 may then include predicting one or more well markers in the well log using the global model, as at 412, and predicting one or more well markers in the well log using the local model, as at 414. As noted above, the models 506, 508 may operate in parallel to one another, e.g., at the same time. The output of the two models 506, 508 (i.e., the predicted labels) may then be merged, e.g., according to equation (1) above, as at 416.

Accordingly, embodiments of the disclosure may consider supervised well correlation as an event detection in a sequence where specific marker locations are detected, given the well log as input. The global and the local context of the well are modeled by appropriate neural network architectures. Use of the global model alone may result in errors in marker pickings, while the use of the local model alone may be prone to false positives. The combination of global and local model, however, may perform better than individual models alone.

In some embodiments, a relatively small network can be used for the task, which in turn reduces the training time and possible issues related to the overfitting. For the marker labels, a label smoothening using the gaussian kernel has shown superior results. In the experiments, we observed that the same network architecture works well across different datasets, so dataset specific hyperparameter tuning is not needed leading to a one click solution.

Figure 7:
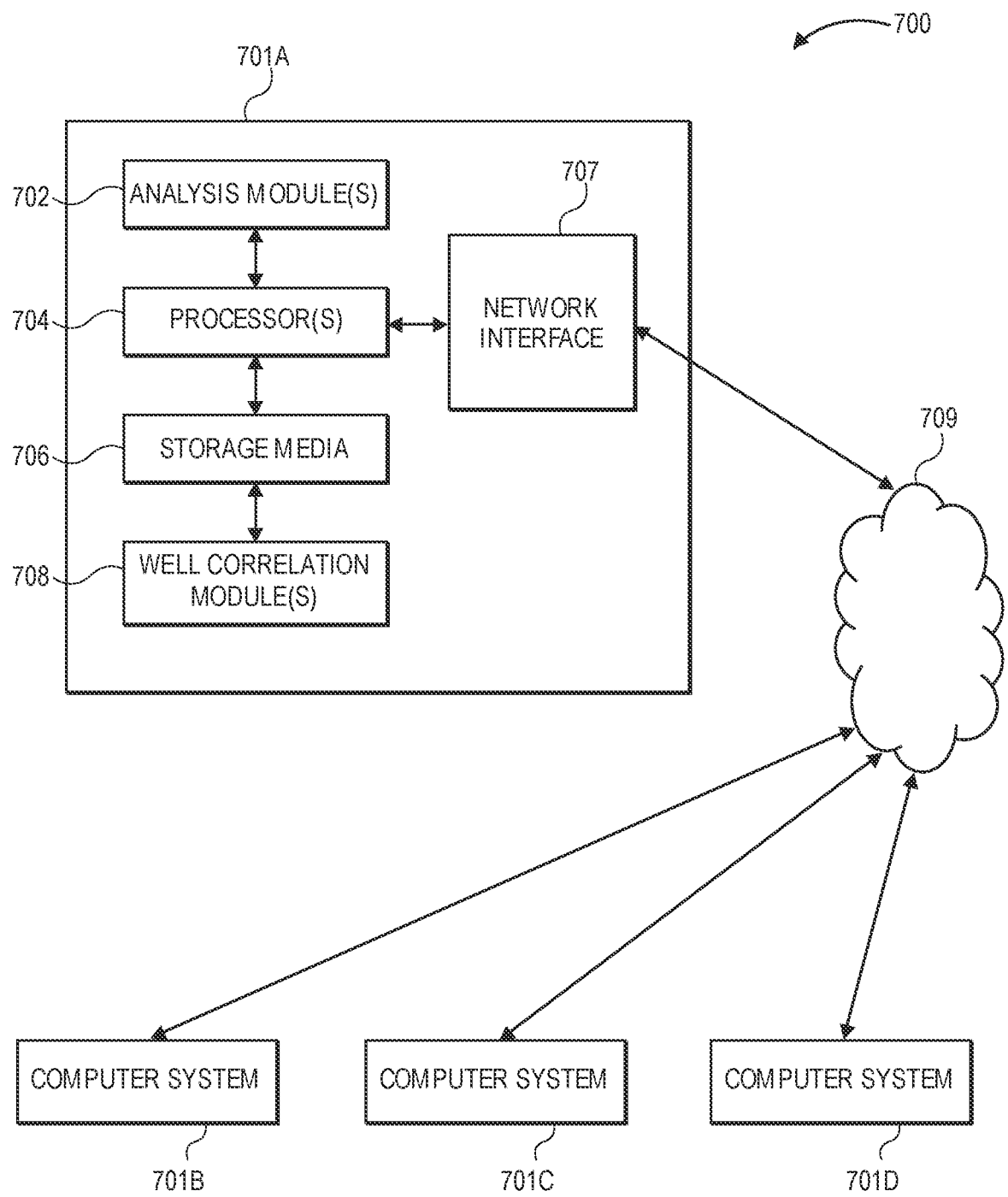
FIG. 7 illustrates a schematic view of a computing system, according to an embodiment.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 602 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 700 contains one or more well correlation module(s) 708. In the example of computing system 700, computer system 701A includes the well correlation module 708. In some embodiments, a single well correlation module may be used to perform some aspects of one or more embodiments of the methods disclosed herein. In other embodiments, a plurality of well correlation modules may be used to perform some aspects of methods herein.

It should be appreciated that computing system 700 is merely one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method for correlating well logs, comprising:
taking measurements along an entirety of a well or along a portion of the well via an instrument deployed into the well;
generating a well log based upon recordings of the measurements;
receiving the well log;
applying the well log as a first input to a first machine learning model comprising an encoder-decoder architecture with skip connections between mirroring layers of an encoder and a decoder, wherein the first machine learning model is configured to predict first markers in the well log based at least in part on a global factor of the well log;
applying the well log as a second input to a second machine learning model comprising a convolutional neural network having a plurality of one-dimensional convolution layers that are stacked together, wherein the second machine learning model is configured to predict second markers in the well log based at least in part on a local factor of the well log;
generating a set of predicted well markers by merging at least some of the first markers and at least some of the second markers;
aligning the well log with respect to one or more other well logs based at least in part on the set of predicted well markers;
generating a digital model of a subterranean volume through which the well log extends based at least in part on the well log that was correlated to the other well logs; and
controlling drilling parameters as part of a drilling operation based on the digital model, wherein controlling the drilling parameters comprises controlling a drilling trajectory, selecting and controlling a type of equipment utilized in the drilling operation, or controlling parameters of the type of equipment utilized in the drilling operation.

2. The method of claim 1, further comprising:
receiving a training set of one or more well logs having one or more markers associated with the one or more well logs, and
raining the first machine learning model and the second machine learning model using the training set.

3. The method of claim 2, further comprising smoothening one or more markers of the training set prior to training the first machine learning model and prior to training the second machine learning model.

4. The method of claim 3, wherein smoothening comprises convolving the one or more markers with a Gaussian kernel.

5. The method of claim 1, wherein the global factor represents a characteristic of the well log as a whole, and wherein the local factor represents a characteristic of an individual layer of a plurality of layers represented in the well log.

6. The method of claim 1, comprising applying the well log as the second input to the second machine learning model in parallel with applying the well log as the first input to the first machine learning model.

7. The method of claim 1, wherein merging at least some of the first markers and at least some of the second markers results in a reduction in error marker pickings of the first markers and a reduction in false positives from the second markers.

8. A non-transitory computer-readable medium storing instructions that, when executed by one or more processors of a computing system, cause the computing system to perform operations, the operations comprising:
receiving a well log generated based upon recordings of measurements taken along an entirety of a well or along a portion of the well via an instrument deployed into the well;
applying the well log as a first input to a first machine learning model the comprising an encoder-decoder architecture with skip connections between mirroring layers of an encoder and a decoder, wherein the first machine learning model is configured to predict first markers in the well log based at least in part on a global factor of the well log;

applying the well log as a second input to a second machine learning model comprising a convolutional neural network having a plurality of one-dimensional convolution layers that are stacked together, wherein the second machine learning model is configured to predict second markers in the well log based at least in part on a local factor of the well log;

generating a set of predicted well markers by merging at least some of the first markers and at least some of the second markers;

aligning the well log with respect to one or more other well logs based at least in part on the set of predicted well markers;

generating a digital model of a subterranean volume through which the well log extends based at least in part on the well log that was correlated to the other well logs; and providing the digital model to control drilling parameters as part of a drilling operation based on the digital model, wherein controlling the drilling parameters comprises controlling a drilling trajectory, selecting and controlling a type of equipment utilized in the drilling operation, or controlling parameters of the type of equipment utilized in the drilling operation.

9. The medium of claim 8, wherein the operations further comprise:

receiving a training set of one or more well logs having one or more markers associated with the one or more well logs, and training the first machine learning model and the second machine learning model using the training set.

10. The medium of claim 9, wherein the operations further comprise smoothening one or more markers of the training set prior to training the first machine learning model and prior to training the second machine learning model.

11. The medium of claim 10, wherein smoothening comprises convolving the one or more markers with a Gaussian kernel.

12. The medium of claim 8, wherein the global factor represents a characteristic of the well log as a whole, and wherein the local factor represents a characteristic of an individual layer of a plurality of layers represented in the well log.

13. A computing system, comprising:
a display device;
one or more processors; and
a memory system including one or more non-transitory computer-readable media storing instructions that, when executed by at least one of the one or more processors, cause the computing system to perform operations, the operations comprising:

receiving a well log generated based upon recordings of measurements taken along an entirety of a well or along a portion of the well via an instrument deployed into the well;

applying the well log as a first input to a first machine learning model comprising an encoder-decoder architecture with skip connections between mirroring layers of an encoder and a decoder, wherein the first machine learning model is configured to predict first markers in the well log based at least in part on a global factor of the well log, wherein the global factor represents a characteristic of the well log as a whole;

applying the well log as a second input to a second machine learning model comprising a convolutional neural network having a plurality of one-dimensional convolution layers that are stacked together, wherein the second machine learning model is configured to predict second markers in the well log based at least in part on a local factor of the well log, wherein the local factor represents a characteristic of an individual layer of a plurality of layers represented in the well log;

generating a set of predicted well markers by merging at least some of the first markers and at least some of the second markers;

aligning the well log with respect to one or more other well logs based at least in part on the set of predicted well markers;

generating a digital model of a subterranean volume through which the well log extends based at least in part on the well log that was correlated to the other well logs; and displaying the digital model using the display device; and providing the digital model to control drilling parameters as part of a drilling operation based on the digital model, wherein controlling the drilling parameters comprises controlling a drilling trajectory, selecting and controlling a type of equipment utilized in the drilling operation, or controlling parameters of the type of equipment utilized in the drilling operation.

* * * * *